(12) United States Patent
Gu et al.

(10) Patent No.: US 12,717,107 B2
(45) Date of Patent: Aug. 25, 2026

(54) POSITIONING FIXTURE FOR FIXING END FACE STRUCTURE OF OPTICAL FIBER SPLICE CLOSURE

(71) Applicant: ACCELIGHT TECHNOLOGIES (WUHAN) CO., LTD., Wuhan (CN)

(72) Inventors: Gong-En Gu, Wuhan (CN); Matthew John Steven Rouleau, Wuhan (CN); Neil Santos, Wuhan (CN); William Sterling, Wuhan (CN); Hengzhi Fan, Wuhan (CN); Wenbing Zhu, Wuhan (CN); Zhehuanyuan Mei, Wuhan (CN); Fei Li, Wuhan (CN)

(73) Assignee: ACCELIGHT TECHNOLOGIES (WUHAN) CO., LTD., Wuhan (CN)

( * ) Notice: Subject to any disclaimer, the term of this patent is extended or adjusted under 35 U.S.C. 154(b) by 225 days.

(21) Appl. No.: 18/629,478

(22) Filed: Apr. 8, 2024

(65) Prior Publication Data

US 2025/0028133 A1 Jan. 23, 2025

Related U.S. Application Data

(63) Continuation of application No. PCT/CN2023/118537, filed on Sep. 13, 2023.

(30) Foreign Application Priority Data

Jul. 21, 2023 (CN) ......................... 202310899397.1

(51) Int. Cl.

| | |
|---|---|
| ***G02B 6/44*** | (2006.01) |
| ***G02B 6/255*** | (2006.01) |
| ***G02B 6/38*** | (2006.01) |

(52) U.S. Cl.

CPC ......... *G02B 6/4454* (2013.01); *G02B 6/2557* (2013.01); *G02B 6/3802* (2013.01); *G02B 6/4446* (2013.01)

(58) Field of Classification Search

CPC .. G02B 6/4454; G02B 6/2557; G02B 6/3802; G20B 6/4446

See application file for complete search history.

(56) References Cited

U.S. PATENT DOCUMENTS

| | | | | |
|---|---|---|---|---|
| 2012/0237173 A1* | 9/2012 | Alston | ................. | G02B 6/2804 29/401.1 |
| 2013/0294739 A1* | 11/2013 | Allen | .................. | G02B 6/4454 385/135 |

* cited by examiner

*Primary Examiner* — Uyen Chau N Le
*Assistant Examiner* — Hoang Q Tran
(74) *Attorney, Agent, or Firm* — Troutman Pepper Locke LLP; Tim Tingkang Xia, Esq.

(57) ABSTRACT

The invention discloses a positioning fixture for fixing an end face structure of an optical fiber splice closure, comprising a fixed clamp, where a movable clamp is connected to the fixed clamp, a locking component is disposed between the fixed clamp and the movable clamp, the fixed clamp is provided with a first groove, the movable clamp is provided with a second groove, and the first groove and the second groove cooperate to form a circular annular slot, where a slot width of the circular annular slot is greater than a thickness of the circumferential flange, the first groove and the second groove are both provided with feature lug bosses that are distributed at intervals along their respective circumferential directions and used for clamping with the circumferential flange.

11 Claims, 6 Drawing Sheets

POSITIONING FIXTURE FOR FIXING END FACE STRUCTURE OF OPTICAL FIBER SPLICE CLOSURE

CROSS-REFERENCE TO RELATED APPLICATIONS

This application is a continuation application of PCT Patent Application Serial No. PCT/CN2023/118537, filed Sep. 13, 2023, which itself claims priority to Chinese Patent Application No. 202310899397.1, filed Jul. 21, 2023, which are hereby incorporated herein in their entireties by reference.

TECHNICAL FIELD

The present invention relates generally to the technical field of optical modules, and more particularly to a positioning fixture for fixing an end face structure of an optical fiber splice closure.

BACKGROUND

The main function of an optical fiber splice closure is to split an optical cable, that is, to split the optical cable into individual optical fibers. The optical fiber splice closure is generally installed on a wall, cable, or utility pole or in a drainage, and it plays a role in providing welding between optical fibers, welding between an optical fiber and a pigtail, and connection between optical connectors.

The optical fiber splice closure mainly comprises a closure cap structure C, a height-adjustable optical fiber tray structure B, and an end face structure A. As shown in FIG. 1, the optical fiber splice closure is mainly applicable to straight-through and branch connection of optical cables of various structures that are laid in a manner such as aerial laying, pipe laying, and directly-buried laying. The optical fiber splice closure is generally fixed by additionally arranging a first assembly component to the closure cap structure C to support and fix the entire optical fiber splice closure, and such structure allows the optical fiber splice closure to be mounted on the wall, cable, or utility pole or in the drainage. However, as the end face structure A of the optical fiber splice closure is in a suspended state, with global warming and increasingly frequent extreme weather, and under severe weather such as extreme storms, rainstorms and hails, the optical fiber splice closure with only fixed closure cap structure may cause shaking of the end face structure A, and further causes poor contact of the internal optical fiber. As a result, the optical fiber splice closure fails, and therefore, the structural design of supporting and fixing an optical fiber splice closure through a single point in the prior art cannot effectively ensure effective support and fixing of the suspended end face structure A, and cannot be adapted to stable use under severe weather, such as extreme storms, rainstorms and hails.

In view of the above defects, there is an urgent need to design a positioning fixture, which is suitable for various extreme weather and ensures the normal operation thereof.

SUMMARY

The technical problem to be solved by the present invention is to provide a positioning fixture for fixing an end face structure of an optical fiber splice closure, aiming at defects in the prior art. The positioning fixture is simple in structure and convenient to use. Furthermore, the additional arrangement of a supporting point to the optical fiber splice closure enables not only the fixation of the end face structure of the optical fiber splice closure, but also the provision of at least two supporting points distributed at intervals in an axial direction for the entire optical fiber splice closure, thus effectively improving service stability and life of the optical fiber splice closure.

The technical solution used by the present invention to solve the technical problem thereof is that:

the present invention provides a positioning fixture for fixing an end face structure of an optical fiber splice closure, where the positioning fixture is used to limit a circumferential flange of the end face structure of the optical fiber splice closure, and comprises a fixed clamp, where a movable clamp is connected to the fixed clamp by means of a first hinge shaft, a locking component is disposed between the fixed clamp and the movable clamp to implement a connection between the fixed clamp and the movable clamp, the fixed clamp is provided with a first groove distributed along a circumferential direction thereof, the movable clamp is provided with a second groove distributed along a circumferential direction thereof, and the first groove and the second groove cooperate to form a circular annular slot, where a slot width of the circular annular slot is greater than a thickness of the circumferential flange, the first groove and the second groove are both provided with feature lug bosses that are distributed at intervals along their respective circumferential directions and used for clamping with the circumferential flange.

In a preferred embodiment of the present invention, the feature lug boss comprises at least two first lug boss portions symmetrically distributed at intervals, a cross-sectional shape of the first lug boss portion is right-angle trapezoidal, inclined surfaces of the two first lug boss portions are oppositely distributed along an axial direction of the circumferential flange, a distance between the inclined surfaces of the two first lug boss portions gradually decreases from inside to outside along a radial direction of the circumferential flange, and a minimum distance between the inclined surfaces of the two first lug boss portions is not greater than the thickness of the circumferential flange.

In a preferred embodiment of the present invention, the feature lug boss further comprises a second lug boss portion disposed at a groove bottom of the first groove or the second groove, a cross-sectional shape of the second lug boss portion is rectangular, and two first lug boss portions are vertically disposed at intervals on the second lug boss portion.

In a preferred embodiment of the present invention, an air bag is disposed in the feature lug boss, the air bag comprises at least one inflation inlet, the air bag is a circular annular air bag with a square cross-section after being inflated, and a groove for cooperation and positioning of the second lug boss portion is disposed on an outer peripheral surface of the circular annular air bag.

In a preferred embodiment of the present invention, the locking component comprises a fastening lock catch clamp connected to an end portion of the movable clamp by means of a second hinge shaft, the fastening lock catch clamp is connected to a U-shaped lock catch by means of a third hinge shaft, and a fixed lug boss with a hole is further disposed on the fastening lock catch clamp.

In a preferred embodiment of the present invention, the fixed clamp is provided with a first protrusion feature for cooperating with the U-shaped lock catch.

In a preferred embodiment of the present invention, the movable clamp is provided with a second lug boss feature that is used for cooperating with the fixed lug boss and has a hole, and a position of the hole on the second lug boss feature corresponds to a position of the hole on the fixed lug boss.

In a preferred embodiment of the present invention, a buffer rubber pad is connected to an end face of the fixed clamp and/or the movable clamp, the buffer rubber pad is arc-shaped, and an inner peripheral surface of the buffer rubber pad is provided with a mounting slot extending along a circumferential direction thereof.

In a preferred embodiment of the present invention, a base is further comprised, and the base is provided with the fixed clamp.

In a preferred embodiment of the present invention, a projection shape of the fixed clamp, the movable clamp, and the fastening lock catch clamp in a plane perpendicular to a central axis of the circumferential flange is an arc shape.

The present invention further discloses an optical fiber splice closure, comprising a closure cap structure, a height-adjustable optical fiber tray structure, and an end face structure, where the closure cap structure is supported and fixed by means of a first assembly component, and the end face structure is supported and fixed by means of a positioning fixture.

Beneficial effects of the present invention are as follows:

1. The positioning fixture provided by the present invention is simple in structure and convenient to use. Furthermore, the additional arrangement of a supporting point to an optical fiber splice closure enables not only the effective fixation of the end face structure of the optical fiber splice closure, but also the provision of at least two supporting points distributed at intervals in an axial direction for the entire optical fiber splice closure, thus effectively improving service stability and life of the optical fiber splice closure.

2. The positioning fixture provided by the present invention uses the following structural design: the positioning fixture comprises a fixed clamp, where a movable clamp is connected to the fixed clamp by means of a first hinge shaft, a locking component is disposed between the fixed clamp and the movable clamp to implement a connection between the fixed clamp and the movable clamp, the fixed clamp is provided with a first groove distributed along a circumferential direction thereof, the movable clamp is provided with a second groove distributed along a circumferential direction thereof, and the first groove and the second groove cooperate to form a circular annular slot, where a slot width of the circular annular slot is greater than a thickness of the circumferential flange, the first groove and the second groove are both provided with feature lug bosses that are distributed at intervals along their respective circumferential directions and used for clamping with the circumferential flange. By means of the foregoing structural design, the circumferential flange of the end face structure can be stably clamped, so that the stable limiting in axial and radial directions of the end face structure is stuck, and it is also convenient to assemble.

3. The positioning fixture provided by the present invention further comprises the following technical feature: the feature lug boss comprises at least two first lug boss portions symmetrically distributed at intervals, a cross-sectional shape of the first lug boss portion is right-angle trapezoidal, inclined surfaces of the two first lug boss portions are oppositely distributed along an axial direction of the circumferential flange, a distance between the inclined surfaces of the two first lug boss portions gradually decreases from inside to outside along a radial direction of the circumferential flange, and a minimum distance between the inclined surfaces of the two first lug boss portions is not greater than the thickness of the circumferential flange. This structural design not only facilitates clamping of the circumferential flange of the end face structure, but also enables stable fixation of the circumferential flange of the end face structure. A distance between the inclined surfaces of the two first lug boss portions gradually decreases from inside to outside along the radial direction of the circumferential flange, thereby ensuring that the circumferential flange is more tightly locked during assembly.

4. The positioning fixture provided by the present invention further comprises the following technical feature: the feature lug boss further comprises a second lug boss portion disposed at a groove bottom of the first groove or the second groove, a cross-sectional shape of the second lug boss portion is rectangular, and two first lug boss portions are vertically disposed at intervals on the second lug boss portion. This technical feature can facilitate processing of the first lug boss portion and also ensure overall stiffness of the clamp.

5. The positioning fixture provided by the present invention further comprises the following technical feature: the locking component comprises a fastening lock catch clamp connected to an end portion of the movable clamp by means of a second hinge shaft, the fastening lock catch clamp is connected to a U-shaped lock catch by means of a third hinge shaft, and a fixed lug boss with a hole is further disposed on the fastening lock catch clamp, the fixed clamp is provided with a first protrusion feature for cooperating with the U-shaped lock catch, the movable clamp is provided with a second lug boss feature that is used for cooperating with the fixed lug boss and has a hole, and a position of the hole on the second lug boss feature corresponds to a position of the hole on the fixed lug boss. The locking component of the present invention has advantages of low cost and convenience in operation.

6. The positioning fixture provided by the present invention further comprises the following technical feature: a buffer rubber pad is connected to an end face of the fixed clamp and/or the movable clamp, the buffer rubber pad is arc-shaped, and an inner peripheral surface of the buffer rubber pad is provided with a mounting slot extending along a circumferential direction thereof. The existence of the buffer rubber pad can not only prevent a collision of the optical fiber splice closure with the positioning fixture. More importantly, when the positioning fixture works, the end face structure of the optical fiber structure closure is in an open state. In this case, a too-large gap in the middle of the positioning fixture may lead to an unstable mounting of the optical fiber splice closure onto the positioning fixture. Therefore, by additionally arranging the buffer rubber pad, the optical fiber splice closure can be fixed and cannot easily fall off.

7. The positioning fixture provided by the present invention further comprises a base, and the base is provided with the fixed clamp. The existence of the base is more beneficial to assembling and fixing of the present invention, so that the present invention is applicable to various scenarios.

8. The positioning fixture provided by the present invention further discloses that a projection shape of the fixed clamp, the movable clamp, and the fastening lock catch clamp in a plane perpendicular to a central axis of the circumferential flange is an arc shape. This structural design has advantages of small space occupation, light volume, and low manufacturing cost.

9. According to the positioning fixture provided by the present invention, an inflatable air bag is disposed in the feature lug boss, so that not only the end face structure of the optical fiber splice closure can be effectively protected, but also the end face structure can be more stably fixed by cooperating an inflated annular air bag with the inclined surfaces of the two first lug boss portions.

10. The present invention further discloses an optical fiber splice closure, comprising a closure cap structure, a height-adjustable optical fiber tray structure, and an end face structure, where the closure cap structure is supported and fixed by means of a first assembly component, and the end face structure is supported and fixed by means of a positioning fixture. The optical fiber splice closure has at least two supporting points, and the end face structure thereof is no longer suspended. Therefore, the optical fiber splice closure can work normally in various extreme weather conditions, thereby effectively improving the working stability thereof.

BRIEF DESCRIPTION OF DRAWINGS

The following further describes the present invention with reference to the accompanying drawings and embodiments, in which.

Figure 1:
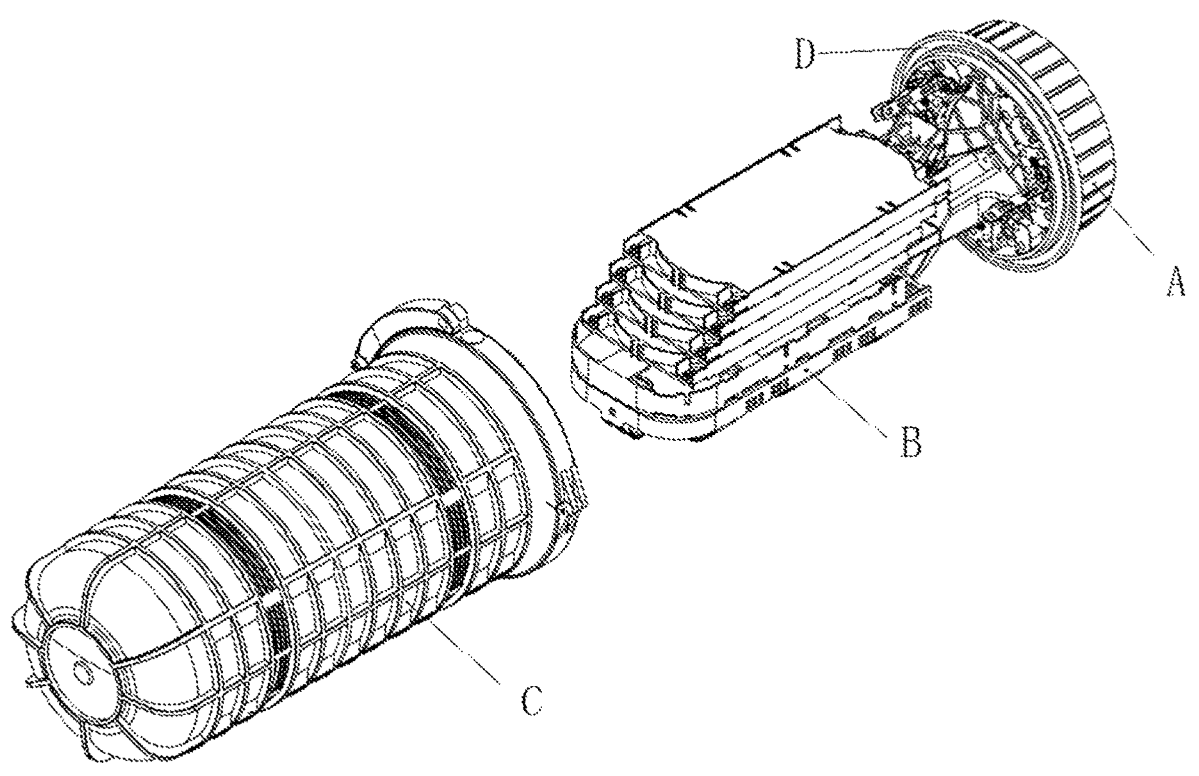
FIG. 1 is a structural diagram of an optical fiber splice closure in the prior art.
Figure 2:
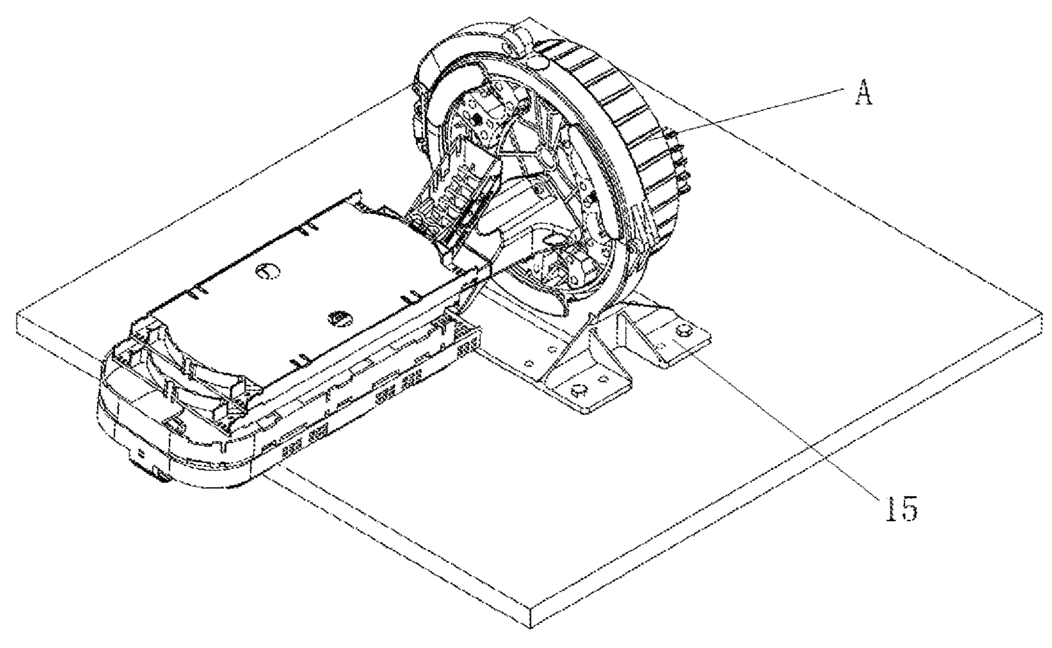
FIG. 2 is a structural diagram of a positioning fixture according to an embodiment of the present invention.
Figure 3:
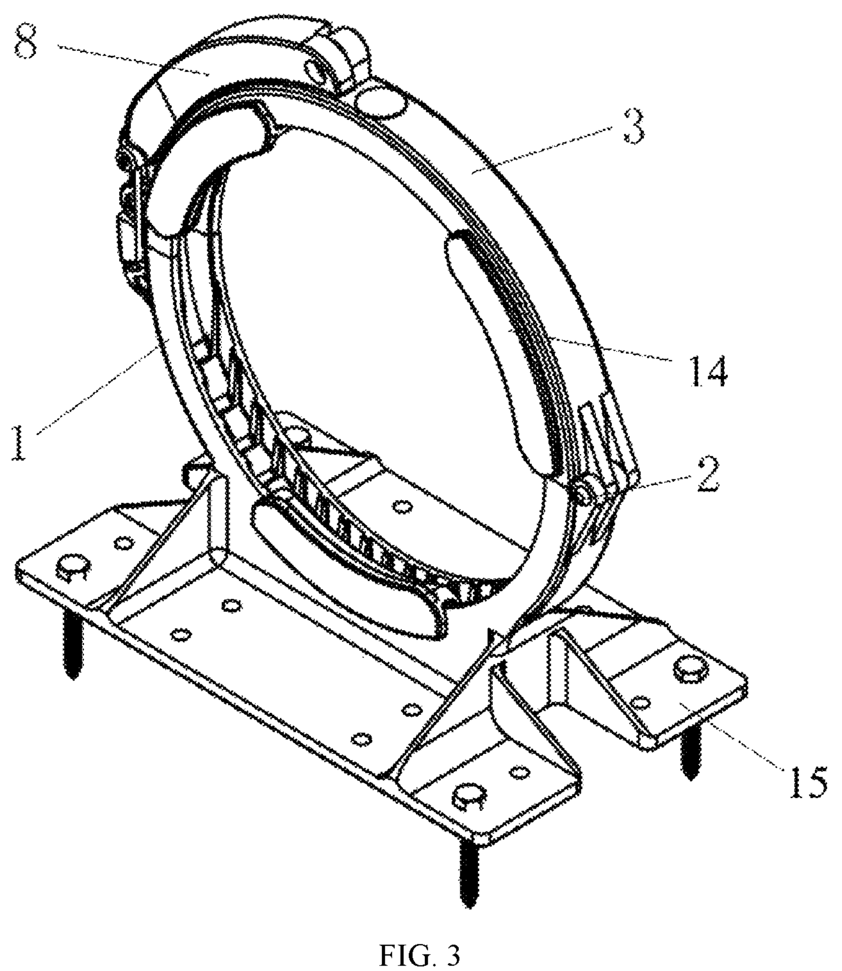
FIG. 3 is a schematic diagram of a fixing state of a positioning fixture according to an embodiment of the present invention.
Figure 4:
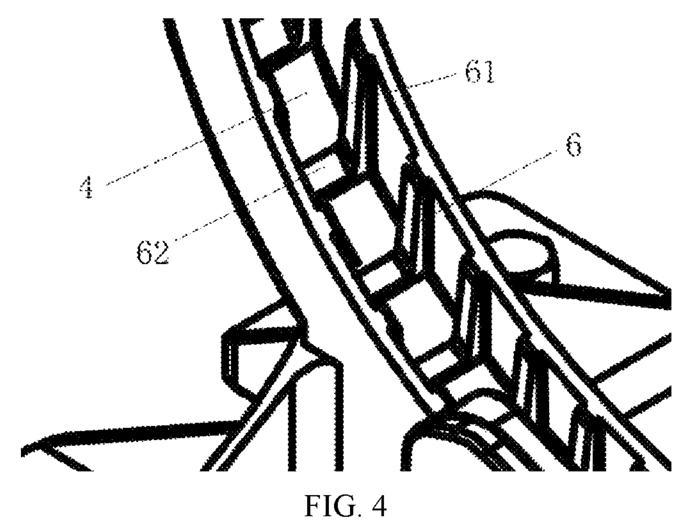
FIG. 4 is a schematic diagram of a feature lug boss of a positioning fixture according to an embodiment of the present invention.
Figure 5:
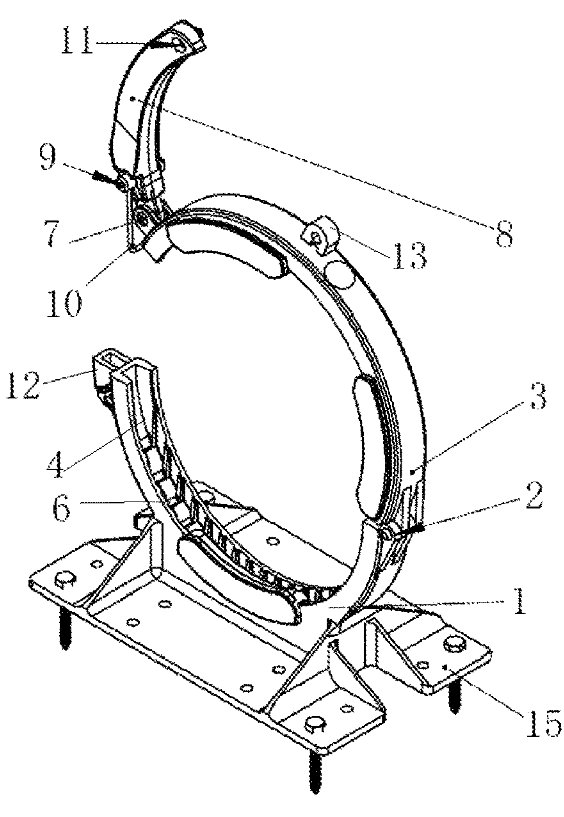
FIG. 5 is a structural diagram of a positioning fixture according to an embodiment of the present invention.
Figure 6:
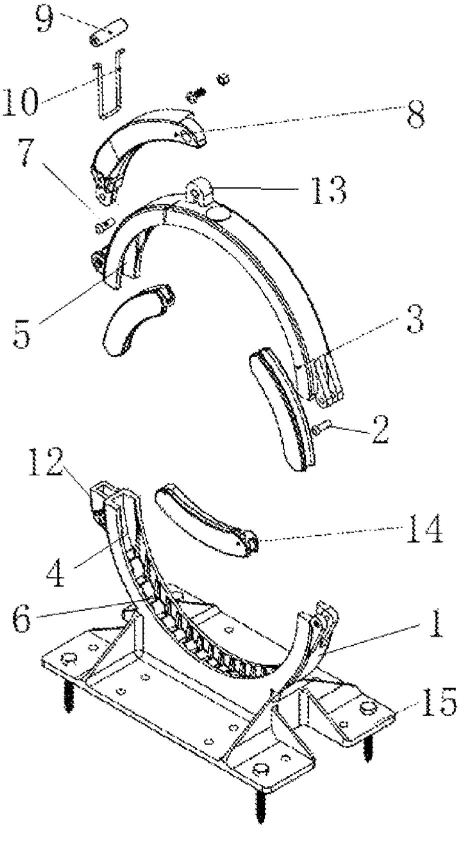
FIG. 6 is an exploded view of a positioning fixture according to an embodiment of the present invention.
Figure 7:
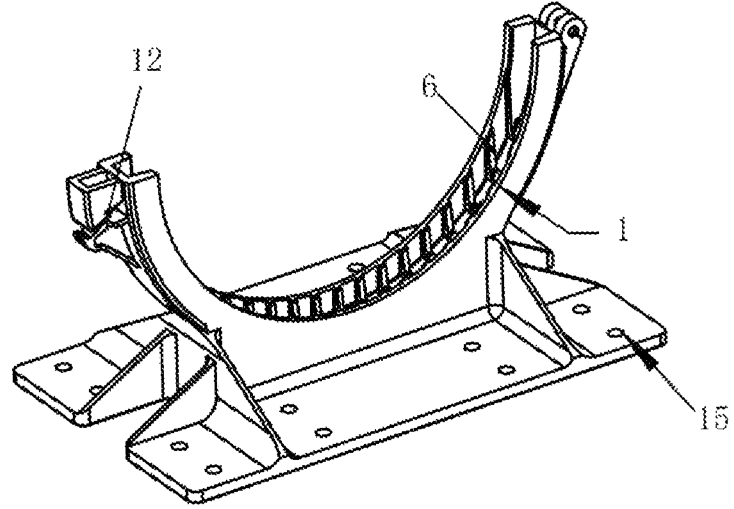
FIG. 7 is a schematic diagram of a fixed clamp of a positioning fixture according to an embodiment of the present invention.

In the drawings: A—end face structure; B—height-adjustable optical fiber tray structure; C—closure cap structure; D—circumferential flange; 1—fixed clamp; 2—first hinge shaft; 3—movable clamp; 4—first groove; 5—second groove; 6—feature lug boss; 7—second hinge shaft; 8—fastening lock catch clamp; 9—third hinge shaft; 10—U-shaped lock catch; 11—fixed lug boss; 12—first protrusion feature; 13—second lug boss feature; 14—buffer rubber pad; 15—base; 16—air bag; 61—first lug boss portion; 62—second lug boss portion; 141—mounting slot; 161—inflation inlet; 162—groove.

DETAILED DESCRIPTION OF THE EMBODIMENTS

To make objectives, technical solutions, and advantages of the present invention more clearly, the following further describes the present invention in detail with reference to the accompanying drawings and embodiments. It should be understood that the specific embodiments described herein are merely intended to explain the present invention, but not to limit the present invention.

As shown in FIGS. 2 to 6, the present invention discloses a positioning fixture for fixing an end face structure of an optical fiber splice closure, where the positioning fixture is used to limit a circumferential flange D of the end face structure of the optical fiber splice closure, and comprises a fixed clamp 1. The fixed clamp 1 is connected to a movable clamp 3 by means of a first hinge shaft 2, the first hinge shaft 2 extends and is distributed along an axial direction of the circumferential flange D, and the movable clamp 3 can be rotated and opened relative to the fixed clamp 1, thus facilitating a mounting of the circumferential flange D of the end face structure of the optical fiber splice closure into the fixed clamp 1. A locking component is disposed between the fixed clamp 1 and the movable clamp 3 to implement a connection between the fixed clamp and the movable clamp, the fixed clamp 1 is provided with a first groove 4 distributed along a circumferential direction thereof, the movable clamp 3 is provided with a second groove 5 distributed along a circumferential direction thereof, and the first groove 4 and the second groove 5 cooperate to form a circular annular slot, where a slot width of the circular annular slot is greater than a thickness of the circumferential flange D, the first groove 4 and the second groove 5 are both provided with feature lug bosses 6 that are distributed at intervals along their respective circumferential directions and used for clamping with the circumferential flange D. After the circumferential flange D is inserted into the feature lug boss 6, degrees of freedom in the axial and radial directions thereof are limited, so that the circumferential flange cannot move.

The feature lug boss 6 of the present invention can be understood as a part for processing a groove on a cuboid block, a width of the cuboid block corresponds to a groove width of the first groove 4 and a groove width of the second groove 5, a height of the cuboid block is not greater than a groove depth of the first groove 4 and a groove depth of the second groove 5, and the groove processed on the cuboid block may be trapezoidal, rectangular, etc., as long as the processed groove can be adapted to the thickness of the circumferential flange D.

Preferably, the groove processed on the cuboid block may be trapezoidal, that is, the feature lug boss 6 comprises at least two first lug boss portions 61 symmetrically distributed at intervals, a cross-sectional shape of the first lug boss portion 61 is right-angle trapezoidal, inclined surfaces of the two first lug boss portions 61 are oppositely distributed along an axial direction of the circumferential flange D, a distance between the inclined surfaces of the two first lug boss portions 61 gradually decreases from inside to outside along a radial direction of the circumferential flange D, and a minimum distance between the inclined surfaces of the two first lug boss portions 61 is not greater than the thickness of the circumferential flange D. The existence of a inclined surface feature ensures that a groove on the feature lug boss 6 is wider at the top and narrower at the bottom. In this way, after adapting to the circumferential flange D of the end face structure of the optical fiber splice closure and tightening the movable clamp 3, the movable clamp 3 and the fixed clamp 1 can lock the circumferential flange D more tightly.

Preferably, the feature lug boss 6 further comprises a second lug boss portion 62 disposed at a groove bottom of the first groove 4 or the second groove 5, a cross-sectional shape of the second lug boss portion 62 is rectangular, and two first lug boss portions 61 are vertically disposed at intervals on the second lug boss portion 62. The existence of the second lug boss portion 62 can effectively increase strength and stiffness of the feature lug boss 6, because the feature lug boss 6, as a thin-walled part, is prone to deformation when clamping the circumferential flange D, and causes failure after being used for a long time. However, the existence of the second lug boss portion 62 can effectively solve a failure problem.

Preferably, the feature lug bosses 6 in both the first groove 4 and the second groove 5 are distributed in a one-to-one correspondence manner, and the feature lug bosses 6 in both the first groove 4 and the second groove 5 are distributed at equal intervals along their respective circumferential directions.

Figure 8:
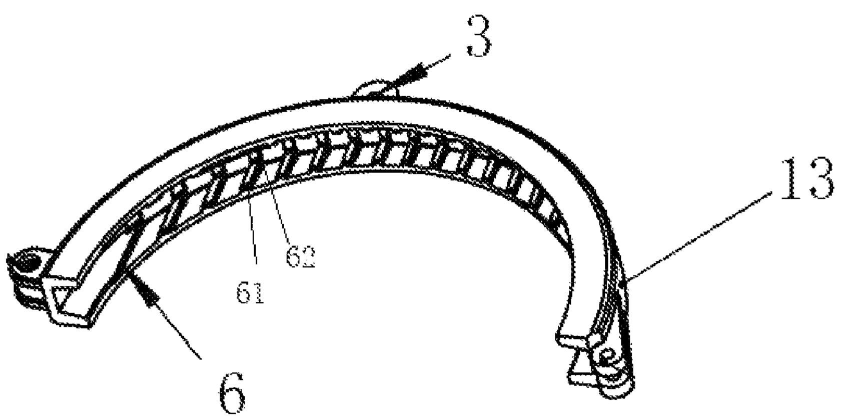
FIG. 8 is a schematic diagram of a movable clamp of a positioning fixture according to an embodiment of the present invention.
Figure 9:
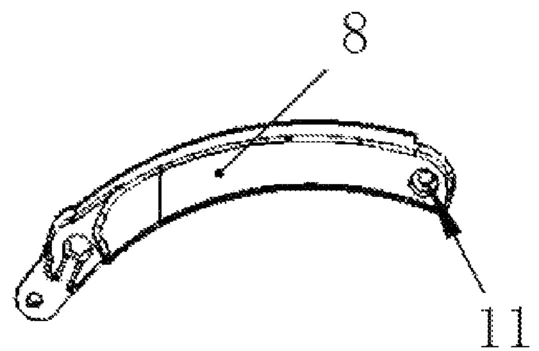
FIG. 9 is a schematic diagram of a fastening lock catch clamp of a positioning fixture according to an embodiment of the present invention.
Figure 10:
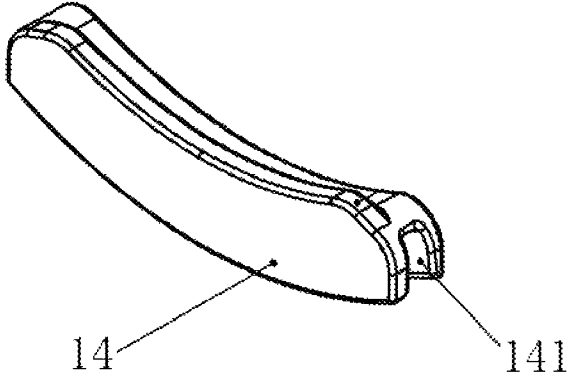
FIG. 10 is a schematic diagram of a buffer rubber pad of a positioning fixture according to an embodiment of the present invention.

Preferably, as shown in FIGS. 8 to 9, a locking component comprises a fastening lock catch clamp 8 connected to an end portion of the movable clamp 3 by means of a second hinge shaft 7, the fastening lock catch clamp 8 is connected to a U-shaped lock catch 10 by means of a third hinge shaft 9, and a fixed lug boss 11 with a hole is further disposed on the fastening lock catch clamp 8. The fastening lock catch clamp 8 is connected to the movable clamp 3 by means of the second hinge shaft 7, and the fastening lock catch clamp 8 may rotate clockwise at a certain angle relative to the second hinge shaft 7. The purpose of rotating the fastening lock catch clamp 8 is to implement adaptive snap-fitting between the U-shaped lock catch 10 on the fastening lock catch clamp 8 and the first protrusion feature 12 on the fixed clamp 1. After the snap-fitting, the fastening lock catch clamp 8 may rotate counterclockwise at a certain angle relative to the second hinge shaft 7. The fixed lug boss 11 on the fastening lock catch clamp 8 cooperates with the second lug boss feature 13 of the movable clamp 3 to be locked by means of a bolt and a nut.

Preferably, the fixed clamp 1 is provided with a first protrusion feature 12 for cooperating with the U-shaped lock catch 10.

Figure 12:
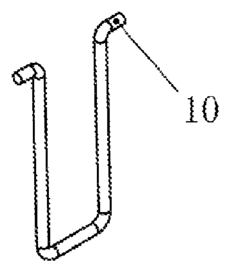
FIG. 12 is a schematic diagram of a U-shaped lock catch of a positioning fixture according to an embodiment of the present invention.
Figure 13:
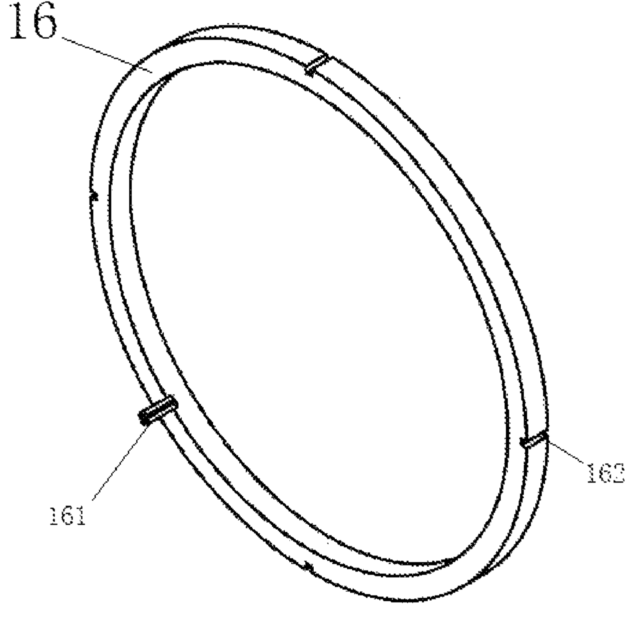
FIG. 13 is a schematic diagram of an air bag (in an inflated state) of a positioning fixture according to an embodiment of the present invention.
Figure 14:
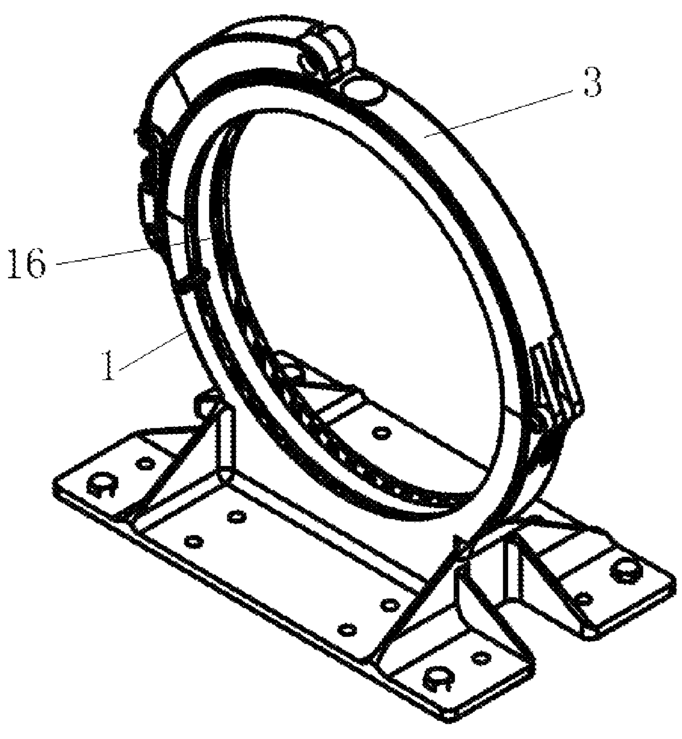
FIG. 14 is a schematic diagram of a mounting state of an air bag of a positioning fixture according to an embodiment of the present invention.

Preferably, as shown in FIG. 12, a U-shaped lock catch 1 is U-shaped, and two ends of the U-shaped lock catch are provided with a hinge shaft. The U-shaped lock catch 1 may be molded by using a special steel with a mold, realizing a final "ji" shape ("ji" means a Chinese character, similar to Ω).

Figure 11:
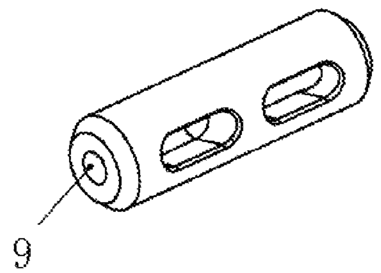
FIG. 11 is a schematic diagram of a third hinge shaft of a positioning fixture according to an embodiment of the present invention.

As shown in FIG. 11, a third hinge shaft 9 cooperating with a U-shaped lock catch 1 is a hollow shaft, two groups of through holes are disposed on an outer peripheral surface of the hollow shaft for two hinge shafts of the U-shaped lock catch 1 to pass through. A penetrating hinge hole is disposed at the center of an end face of the third hinge shaft 9, the hinge hole and the hinge shaft cooperate to implement rotatable assembly of the U-shaped lock catch 1, and the through hole, the hinge hole and a hollow section of the third hinge shaft 9 are in communication with each other.

Preferably, the movable clamp 3 is provided with a second lug boss feature 13 that is used for cooperating with the fixed lug boss 11 and has a hole, and a position of the hole on the second lug boss feature 13 corresponds to a position of the hole on the fixed lug boss 11.

Preferably, a buffer rubber pad 14 is connected to an end face of the fixed clamp 1 and/or the movable clamp 3, a plurality of buffer rubber pads 14 may be disposed, the buffer rubber pad 14 is arc-shaped, and an inner peripheral surface of the buffer rubber pad 14 is provided with a mounting slot 141 extending along a circumferential direction thereof. The buffer rubber pad 14 is made of rubber, a circumferential flange D of an end face structure of an optical fiber splice closure can be in interference fit with the buffer rubber pad 14, and the end face structure of the optical fiber splice closure is fixed and locked by extruding the rubber to deform.

Preferably, a base 15 is further comprised, and the base 15 is provided with the fixed clamp.

Preferably, a projection shape of the fixed clamp 1, the movable clamp 3, and the fastening lock catch clamp 8 in a plane perpendicular to a central axis of the circumferential flange D is an arc shape.

Preferably, an air bag 16 is disposed in a feature lug boss 6, the air bag 16 comprises at least one inflation inlet 161, the air bag 16 is a circular annular air bag with a square cross-section after being inflated, and a groove 162 for cooperation and positioning of the second lug boss portion 62 is disposed on an outer peripheral surface of the circular annular air bag. The air bag 16 cooperates with the second lug boss portion 62 by means of the groove 162 to perform circumferential limiting, and the air bag 16 can elastically float along a radial direction of the circumferential flange D. The existence of the air bag 16 can not only effectively protect the circumferential flange D of the end face structure of the optical fiber splice closure from colliding with the feature lug boss when being mounted, but also enable the end face structure to be more stably fixed when the inflated annular air bag cooperates with the inclined surfaces of the two first lug boss portions.

The present invention further discloses an optical fiber splice closure, comprising a closure cap structure C, a height-adjustable optical fiber tray structure B, and an end face structure A, where the closure cap structure C is supported and fixed by means of a first assembly component, and the end face structure A is supported and fixed by means of a positioning fixture. After the present invention is used, the optical fiber splice closure has at least two supporting points, so that the end face structure thereof is no longer suspended. Therefore, the optical fiber splice closure can work normally in various extreme weather conditions, thereby effectively improving working stability of the optical fiber splice closure.

In the description of the present application, it should be noted that, the orientations or positional relationships indicated by the terms "up", "down", etc. are based on those shown in the accompanying drawings, intended only for the convenience of describing the present application and for simplifying the description, and not intended to indicate or imply that the referred apparatus or element must be provided with a particular orientation or constructed and operated with a particular orientation, therefore not allowed to be construed as a limitation of the present application. Unless otherwise explicitly specified and limited, the terms "mounted", "attached", "connected" should be understood in a broad sense, e.g., it may be a fixed connection, a detachable connection or an integral connection; it may be a mechanical connection or an electrical connection; it may be a direct attachment, or an indirect attachment through an intermediate medium; and it may be a communication within two elements. Those of ordinary skill in the art can understand specific meanings of these terms in this application based on specific situations.

It should be noted that in the present application, relational terms such as "first" and "second" are only used to distinguish one entity or operation from another, and do not necessarily require or imply that any actual relationship or sequence exists between these entities or operations. Moreover, the terms "include" and "comprise", or any of their variants are intended to cover a non-exclusive inclusion, so that a process, method, article, or device that includes a list of elements not only includes those elements but also includes other elements that are not expressly listed, or further includes elements inherent to such process, method, article, or device. Without being subject to further limitations, an element defined by a sentence "include a . . . " does not exclude presence of other identical elements in the process, method, article, or device that includes the very element.

The foregoing descriptions are merely specific implementations of the present application, so that those skilled in the art can understand or implement the present application. Various modifications to the embodiments are obvious to those skilled in the art, and general principles defined in this specification may be implemented in other embodiments without departing from the spirit or scope of the present application. Therefore, the present application will not be limited to the embodiments described in this specification but extends to the widest scope that complies with the principles and novelty applied in this specification.

What is claimed is:

1. A positioning fixture for fixing an end face structure of an optical fiber splice closure, wherein the positioning fixture is used to limit a circumferential flange (D) of the end face structure of the optical fiber splice closure, and comprises a fixed clamp (1), wherein a movable clamp (3) is connected to the fixed clamp (1) by means of a first hinge shaft (2), a locking component is disposed between the fixed clamp (1) and the movable clamp (3) to implement a connection between the fixed clamp and the movable clamp, the fixed clamp (1) is provided with a first groove (4) distributed along a circumferential direction thereof, the movable clamp (3) is provided with a second groove (5) distributed along a circumferential direction thereof, and the first groove (4) and the second groove (5) cooperate to form a circular annular slot, wherein a slot width of the circular annular slot is greater than a thickness of the circumferential flange (D), the first groove (4) and the second groove (5) are both provided with feature lug bosses (6) that are distributed at intervals along their respective circumferential directions and used for clamping with the circumferential flange (D).

2. The positioning fixture for fixing an end face structure of an optical fiber splice closure according to claim 1, wherein the feature lug boss (6) comprises at least two first lug boss portions (61) symmetrically distributed at intervals, a cross-sectional shape of the first lug boss portion (61) is right-angle trapezoidal, inclined surfaces of the two first lug boss portions (61) are oppositely distributed along an axial direction of the circumferential flange (D), a distance between the inclined surfaces of the two first lug boss portions (61) gradually decreases from inside to outside along a radial direction of the circumferential flange (D), and a minimum distance between the inclined surfaces of the two first lug boss portions (61) is not greater than the thickness of the circumferential flange (D).

3. The positioning fixture for fixing an end face structure of an optical fiber splice closure according to claim 2, wherein the feature lug boss (6) further comprises a second lug boss portion (62) disposed at a groove bottom of the first groove (4) or the second groove (5), a cross-sectional shape of the second lug boss portion (62) is rectangular, and two first lug boss portions (61) are vertically disposed at intervals on the second lug boss portion (62).

4. The positioning fixture for fixing an end face structure of an optical fiber splice closure according to claim 3, wherein an air bag (16) is disposed in the feature lug boss (6), the air bag (16) comprises at least one inflation inlet, the air bag (16) is a circular annular air bag with a square cross-section after being inflated, and a groove for cooperation and positioning of the second lug boss portion (62) is disposed on an outer peripheral surface of the circular annular air bag.

5. The positioning fixture for fixing an end face structure of an optical fiber splice closure according to claim 1, wherein the locking component comprises a fastening lock catch clamp (8) connected to an end portion of the movable clamp (3) by means of a second hinge shaft (7), the fastening lock catch clamp (8) is connected to a U-shaped lock catch (10) by means of a third hinge shaft (9), and a fixed lug boss (11) with a hole is further disposed on the fastening lock catch clamp (8).

6. The positioning fixture for fixing an end face structure of an optical fiber splice closure according to claim 5, wherein the fixed clamp (1) is provided with a first protrusion feature (12) for cooperating with the U-shaped lock catch (10).

7. The positioning fixture for fixing an end face structure of an optical fiber splice closure according to claim 6 wherein a projection shape of the fixed clamp (1), the movable clamp (3), and the fastening lock catch clamp (8) in a plane perpendicular to a central axis of the circumferential flange (D) is an arc shape.

8. The positioning fixture for fixing an end face structure of an optical fiber splice closure according to claim 5, wherein the movable clamp (3) is provided with a second lug boss feature (13) that is used for cooperating with the fixed lug boss (11) and has a hole, and a position of the hole on the second lug boss feature (13) corresponds to a position of the hole on the fixed lug boss (11).

9. The positioning fixture for fixing an end face structure of an optical fiber splice closure according to claim 8, wherein a projection shape of the fixed clamp (1), the movable clamp (3), and the fastening lock catch clamp (8) in a plane perpendicular to a central axis of the circumferential flange (D) is an arc shape.

10. The positioning fixture for fixing an end face structure of an optical fiber splice closure according to claim 1, wherein a buffer rubber pad (14) is connected to an end face of the fixed clamp (1) and/or the movable clamp (3), the buffer rubber pad (14) is arc-shaped, and an inner peripheral surface of the buffer rubber pad (14) is provided with a mounting slot (141) extending along a circumferential direction thereof.

11. The positioning fixture for fixing an end face structure of an optical fiber splice closure according to claim 1, further comprising a base (15), wherein the base (15) is provided with the fixed clamp.

* * * * *